United States Patent
Xu et al.

(10) Patent No.: US 10,915,193 B2
(45) Date of Patent: Feb. 9, 2021

(54) TOUCH PANEL, DISPLAY DEVICE AND MANUFACTURING METHOD OF TOUCH PANEL

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Jiawei Xu, Beijing (CN); Lei Zhang, Beijing (CN); Tsung Chieh Kuo, Beijing (CN); Qingpu Wang, Beijing (CN); Xiaoyue He, Beijing (CN)

(73) Assignees: HEFEI XINSHENG OPTOELECTRONICS TECHNOLOGY CO., LTD., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/547,848

(22) Filed: Aug. 22, 2019

(65) Prior Publication Data

US 2019/0377450 A1 Dec. 12, 2019

Related U.S. Application Data

(63) Continuation-in-part of application No. 15/742,774, filed as application No. PCT/CN2017/092972 on Jul. 14, 2017, now Pat. No. 10,429,975.

(30) Foreign Application Priority Data

Aug. 25, 2016 (CN) .......................... 2016 1 0725053

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 2203/04107* (2013.01); *G06F 2203/04111* (2013.01); *G06F 2203/04112* (2013.01)

(58) Field of Classification Search
CPC ................... G06F 3/0412; G06F 3/044; G06F 2203/04107; G06F 2203/04111; G06F 2203/04112
See application file for complete search history.

(56) References Cited

U.S. PATENT DOCUMENTS

| 2014/0071064 A1* | 3/2014 | Cho ........................ G06F 3/044 345/173 |
| 2014/0368755 A1 | 12/2014 | Chen et al. |

(Continued)

FOREIGN PATENT DOCUMENTS

| CN | 103677461 A | 3/2014 |
| CN | 104391389 A | 3/2015 |

(Continued)

OTHER PUBLICATIONS

International Search Report and Written Opinion dated Oct. 24, 2017; PCT/CN2017/092972.

(Continued)

*Primary Examiner* — Peter D McLoone

(57) ABSTRACT

A touch panel, a display device and a manufacturing method of the touch panel are provided, including: a display area and a peripheral area including a bonding area; a first electrode layer and a second electrode layer configured to sense touch and an insulating layer provided between the first electrode layer and the second electrode layer; a first ground wire layer provided in the bonding area on the substrate, the insulating layer including an opening provided on the first ground wire layer, the opening exposing a part of the first ground wire layer; and a second ground wire layer provided on the first (Continued)

insulating layer and the exposed part of the first ground wire layer. The exposed part of the first ground wire layer and the second ground wire layer contact each other in the opening of the insulating layer in the bonding area.

20 Claims, 7 Drawing Sheets

(56) References Cited

U.S. PATENT DOCUMENTS

2017/0139525 A1* 5/2017 Jo ........................... G06F 3/041
2017/0262091 A1  9/2017 Wang et al.
2018/0033833 A1* 2/2018 An ........................ G06F 3/0446

FOREIGN PATENT DOCUMENTS

| CN | 204270269 U | 4/2015 |
| CN | 105824461 A | 8/2016 |
| CN | 106325601 A | 1/2017 |
| CN | 206133506 U | 4/2017 |

OTHER PUBLICATIONS

USPTO NFOA dated Dec. 14, 2018 in connection with U.S. Appl. No. 15/742,774.
USPTO NOA dated May 21, 2019 in connection with U.S. Appl. No. 15/742,774.

* cited by examiner

TOUCH PANEL, DISPLAY DEVICE AND MANUFACTURING METHOD OF TOUCH PANEL

CROSS REFERENCE TO RELATED APPLICATIONS

The present application is a Continuation-in-Part application of U.S. application Ser. No. 15/742,774, which claims the benefits of and priority to the Chinese patent application No. 201610725053.9 filed on Aug. 25, 2016 and entitled "Touch Panel, Display Device and Manufacturing Method of Touch Panel" and it is incorporated herein by reference in its entirety.

TECHNICAL FIELD

Embodiments of the present disclosure relate to a touch panel, a display device and a manufacturing method of the touch panel.

BACKGROUND

Touch panels are external input devices applied widely and increasingly, which implements input by a simple touch by a finger and allows the man-machine interaction process to be directly performed, and has features of simple, fast and humanization.

SUMMARY

Embodiments of the present disclosure relates to a touch panel, a display device, and a manufacturing method of the touch panel.

At least one embodiment of the present disclosure provides a touch panel, comprising a display area, and a peripheral area including a bonding area; a first electrode layer and a second electrode layer configured to sense touch; a first insulating layer provided between the first electrode layer and the second electrode layer; a first ground wire layer provided in the bonding area on the substrate, the first insulating layer including an opening provided on the first ground wire layer, the opening exposing a part of the first ground wire layer; and a second ground wire layer provided on the first insulating layer and the exposed part of the first ground wire layer in the bonding area. The exposed part of the first ground wire layer and the second ground wire layer contact each other in the opening of the first insulating layer in the bonding area.

For example, the first electrode layer and the second electrode layer are disposed in the display area; the first ground wire layer including a first ground wire and the second ground wire layer including a second ground wire disposed in the bonding area; and the first ground wire and the second ground wire in the bonding area are electrically connected in parallel in the opening of the insulating layer in the bonding area.

For example, the second ground wire layer has an orthographic projection on the substrate overlapping with an orthographic projection of the first ground wire layer on the substrate.

For example, the first ground wire layer has a width same as a width of the second ground wire layer.

For example, the width of the second ground wire layer is wider than the width of the first ground wire layer.

For example, the touch panel further comprises a buffer layer provided on the substrate, the buffer layer being disposed between the substrate and the first ground wire layer; and a second insulating layer provided on the second ground wire layer.

For example, the first electrode layer comprises a plurality of lateral touch electrodes, and the second electrode layer comprises a plurality of longitudinal touch electrodes, the plurality of the lateral touch electrodes and the plurality of longitudinal touch electrodes being intersected to and insulated from each other by the first insulating layer to form a mesh touch structure.

For example, the touch panel further comprises, a black matrix provided on the substrate with a plurality of apertures, the first lateral touch electrodes being formed in the apertures; a first metal wiring layer on the black matrix. The first metal wiring layer includes first wirings configured to electrically connect with first driving integrated chips respectively connected with the lateral touch electrodes; and a second metal wiring layer including second wirings on the first insulating layer and configured to electrically connect with second driving integrated chips respectively connected with the longitudinal touch electrodes. The first ground wire layer and the first metal wiring layer are disposed in a same layer, and the first ground wire layer includes a material same as that of the first metal wiring layer; and the second ground wire layer and the second metal wiring layer are disposed in a same layer, and the second ground wire layer includes a material same as that of the second metal wiring layer.

For example, the second ground wire layer and the second electrode layer are disposed in a same layer and the second ground wire layer includes a material same as that of the second electrode layer.

For example, the touch panel further comprises a plurality of dummy electrodes provided between any adjacent longitudinal touch electrodes or any adjacent lateral touch electrodes. A gap is provided between any adjacent touch electrode and a corresponding dummy electrode.

For example, the first ground wire layer includes a material same as that of the first electrode layer, and the first ground wire layer is disposed in a same layer as the first electrode layer.

For example, two openings are provided in the first insulating layer in the bonding area, the second ground wire layer includes a material same as that of the second electrode layer, and the second ground wire layer and the second electrode layer are disposed in a same layer.

At least one embodiment of the present disclosure also provides a display device, comprising the touch panel.

At least one embodiment of the present disclosure also provides a manufacturing method of a touch panel, the touch panel including a display area and a peripheral area including a bonding area, the method comprising: providing a substrate; forming a first electrode layer in the display area, and a first ground wire layer in the bonding area on the substrate; forming a first insulating layer on the first electrode layer and the first ground wire layer; forming an opening in the first insulating layer to expose a part of the first ground wire layer; forming a second electrode layer in the display area, and a second ground wire layer in the bonding area on the first insulating layer and the exposed part of the first ground wire layer. The exposed part of the first ground wire layer and the second ground wire layer contact each other in the opening of the first insulating layer in the bonding area.

For example, the first electrode layer and the second electrode layer are formed in the display area; the first ground wire layer including a first ground wire and the second ground wire layer including a second ground wire are formed in the bonding area; and the first ground wire and the second ground wire in the bonding area are electrically connected in parallel in the opening of the first insulating layer.

For example, the second ground wire layer has an orthographic projection on the substrate overlapping with an orthographic projection of the first ground wire layer on the substrate.

For example, forming a black matrix with a plurality of apertures to receive the first electrode layer including a plurality of lateral touch electrodes; forming a first metal wiring layer on the black matrix; and forming a second metal wiring layer on the first insulating layer. The second electrode layer comprises a plurality of longitudinal touch electrodes, the plurality of the lateral touch electrodes and the plurality of longitudinal touch electrodes being intersected to and insulated from each other by the first insulating layer to form a mesh touch structure.

For example, the first ground wire layer has a width same as a width of the second ground wire layer.

For example, the width of the second ground wire layer is wider than the width of the first ground wire layer.

For example, depositing a metal layer on the substrate and forming a pattern of a first ground wire by a patterning process; etching the first insulating layer by an etching process to form the opening in the first insulating layer in the bonding area; depositing a metal layer on the first insulating layer formed with the opening and forming a pattern of a second ground wire by a patterning process. The second ground wire and the first ground wire are electrically connected in parallel in the opening of the first insulating layer.

According to at least one embodiment of the present disclosure, a touch panel is provided. The touch panel comprises: a first electrode layer and a second electrode layer configured to sense a touch and an insulating layer located between the first electrode layer and the second electrode layer; a first ground wire disposed on a side of the insulating layer facing the first electrode layer; and a second ground wire disposed on a side of the insulating layer facing the second electrode layer. The first ground wire or the second ground wire is electrically connected with a grounding terminal; and the insulating layer is provided with a ground wire vias through which the first ground wire and the second ground wire are electrically connected with each other.

For example, the touch panel also comprises: a display area and a black matrix region surrounding the display area. The first electrode layer and the second electrode layer are located in the display area; and the first ground wire and the second ground wire are disposed along the black matrix region.

For example, the first electrode layer comprises a lateral touch electrode and a longitudinal touch electrode; and the second electrode layer comprises an electrode bridge point configured to bridge the lateral touch electrode and the longitudinal touch electrode at an intersection.

For example, the touch panel also comprises: a metal wiring disposed on the side of the insulating layer facing the first electrode layer and configured to electrically connect the lateral touch electrode and the longitudinal touch electrode with a driving chip. The first ground wire and the metal wiring are disposed in a same layer, and the first ground wire includes a material same as that of the metal wiring.

For example, the second ground wire and the second electrode layer are disposed in a same layer and the second ground wire includes a material same as that of the second electrode layer.

For example, the material of the first electrode layer is indium tin oxide; and the material of the second electrode layer is indium tin oxide.

For example, the first electrode layer comprises a lateral touch electrode; and the second electrode layer comprises a longitudinal touch electrode.

For example, the first ground wire includes a material same as that of the first electrode layer, and the first ground wire is disposed in a same layer as the first electrode layer.

For example, the second ground wire includes a material same as that of the second electrode layer, and the second ground wire and the second electrode layer are disposed in a same layer.

According to embodiments of the present disclosure, a display device is provided, comprising the touch panel.

According to embodiments of the present disclosure, a manufacturing method of a touch panel is provided, comprising: forming a first electrode layer and a first ground wire on a substrate; forming an insulating layer on the first electrode layer and the first ground wire, the insulating layer being provided with a ground wire vias; and forming a second electrode layer and a second ground wire on the insulating layer. The first ground wire, or the second ground wire is electrically connected with a grounding terminal, and the first ground wire and the second ground wire are electrically connected with each other through the ground wire vias of the insulating layer.

For example, the substrate comprises a display area and a black matrix region surrounding the display area. The first electrode layer and the second electrode layer are formed in the display area; and the first ground wire and the second ground wire are formed in the black matrix region.

For example, the first electrode layer comprises a lateral touch electrode and a longitudinal touch electrode; and the second electrode layer comprises an electrode bridge point configured to bridge the lateral touch electrode and the longitudinal touch electrode at an intersection. The manufacturing method also comprises: depositing a transparent electrode layer on the substrate and forming patterns of the lateral touch electrode and the longitudinal touch electrode by a patterning process; depositing a metal layer on the substrate and forming patterns of the first ground wire and the metal wiring by a patterning process. The metal wiring electrically connects the lateral touch electrode and the longitudinal touch electrode with a driving chip. The manufacturing method also comprises depositing a transparent electrode layer on the insulating layer and forming patterns of the electrode bridge point and the second ground wire by a patterning process.

For example, the second electrode layer comprises a lateral touch electrode and a longitudinal touch electrode; and the first electrode layer comprises an electrode bridge point configured to bridge the lateral touch electrode and the longitudinal touch electrode at an intersection. The manufacturing method also comprises: depositing a transparent electrode layer on the substrate and forming patterns of the electrode bridge point and the first ground wire by a patterning process. The manufacturing method also comprises: depositing a transparent electrode layer on the insulating layer and forming patterns of the lateral touch electrode and the longitudinal touch electrode by a patterning process; and depositing a metal layer on the insulating layer and forming patterns of the second ground wire and the metal wiring by a patterning process. The metal wiring electrically connects the lateral touch electrode and the longitudinal touch electrode with a driving chip.

For example, the first electrode layer comprises a lateral touch electrode, and the second electrode layer comprises a longitudinal touch electrode. The manufacturing method also comprises: depositing a first electrode layer on the substrate and forming patterns of the lateral touch electrode and the first ground wire by a patterning process; and depositing a second electrode layer on the insulating layer and forming patterns of the longitudinal touch electrode and the second ground wire by a patterning process.

BRIEF DESCRIPTION OF THE DRAWINGS

Embodiments of the present disclosure will be described in more detail below with reference to accompanying drawings to allow an ordinary skill in the art to more clearly understand embodiments of the present disclosure, in which.

DETAILED DESCRIPTION

Figure 1:
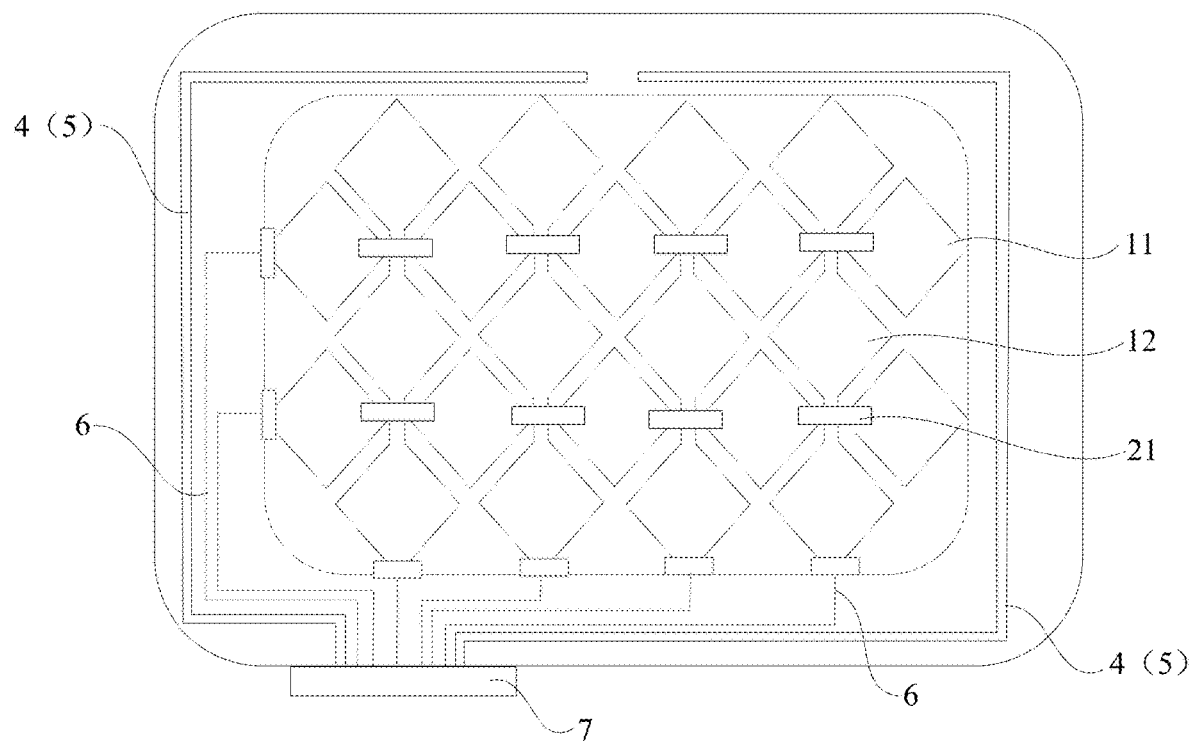
FIG. 1 is a schematically structural diagram of a touch panel provided in an embodiment of the present disclosure.

Technical solutions of the embodiments will be described in a clearly and fully understandable way in connection with the drawings related to the embodiments of the disclosure. It is apparent that the described embodiments are just a part but not all of the embodiments of the disclosure. Based on the described embodiments herein, those skilled in the art can obtain other embodiment(s), without any creative work, which shall be within the scope of the disclosure.

The inventors noticed that the touch panels suffer more and more the electrostatic (ESD) affect with the extension of application fields of touch panels and the popularity of large size touch panels. For example, the touch panels in the art have no effective protection ways against the generation of the inductive electrostatic and releasing of electrostatic accumulation during the manufacturing process, structures, such as sensing electrodes, and metal wirings in touch panels, are susceptible to poor electrostatic induction. And the light blocking structure in the black matrix region in the touch panels in the art consists of carbon wrapped in resin layer, when electrostatic induction currents are generated in metal wirings or sensing electrode paths of the black matrix region, the resin layer of the light blocking structure tends to be electrically broken down such that the light blocking structure forms a conducting path, resulting in problems, such as higher analog-to-digital converter (ADC) on electrical side edge, and short circuiting between the transmitting electrode and the receiving electrode (Tx&Rx short).

As shown in FIGS. 1-4, a touch panel provided in an embodiment of the present disclosure includes a first electrode layer 1 and a second electrode layer 2 for sensing touch, and an insulating layer 3 located between the first electrode layer 1 and the second electrode layer 2. The touch panel also includes a first ground wire 4 disposed on a side of the insulating layer 3 facing the first electrode layer 1 and a second ground wire 5 disposed on a side of the insulating layer 3 facing the second electrode layer 2. The first ground wire 4 is electrically connected with the grounding terminal and/or the second ground wire 5 is electrically connected with the grounding terminal. The insulating layer 3 is provided with a ground wire vias 31 through which the first ground wire 4 and the second ground wire 5 are electrically connected with each other.

In the touch panel, the first ground wire 4 and the second ground wire 5 are respectively disposed in the two layers of electrode layer (the first electrode layer 1 and the second electrode layer 2) structure for touch sensing, and the first ground wire 4 and/or the second ground wire 5 are electrically connected with the grounding terminal. The first ground wire 4 and the second ground wire 5 can serve as an electrostatic shielding for the two electrode layers to avoid interference from external charges. In addition, the first ground wire 4 and the second ground wire 5 can conduct static electricity generated in the two electrode layers out in time to avoid poor sensing of touch due to electrostatic accumulation and releasing. In this way, the touch panel can avoid poor yield due to electrostatic (ESD).

As shown in FIG. 1, in an exemplary embodiment, the touch panel may include a display area and a black matrix region surrounding the display area. The first electrode layer 1 and second electrode layer 2 are located in the display area, and the first ground wire 4 and second ground wire 5 are arranged along the black matrix region. For example, the first ground wire 4 and second ground wire 5 may be strip structures extending along the black matrix region.

The first ground wire 4 and the second ground wire 5 extend along the black matrix region, that is, the first ground wire 4 and the second ground wire 5 enclose the first electrode layer 1 and the second electrode layer 2 such that the first ground wire 4 and the second ground wire 5 may effectively shield the first electrode layer 1 and the second electrode layer 2. In this way, it is possible to effectively avoid interference to the first electrode layer 1 and the second electrode layer 2 by external charges. Furthermore, the first ground wire 4 and the second ground wire 5 may conduct static electricity generated around the first electrode layer 1 and the second electrode layer 2 out in time, which can effectively avoid electrostatic accumulation and effectively avoid poor sensing of touch due to electrostatic discharge. In addition, the first ground wire 4 and the second ground wire 5 are disposed along the black matrix region, so that they are not likely to contact and short with the first electrode layer 1 and the second electrode layer 2, and will not affect the display area due to light blocking, for example.

Figure 2:
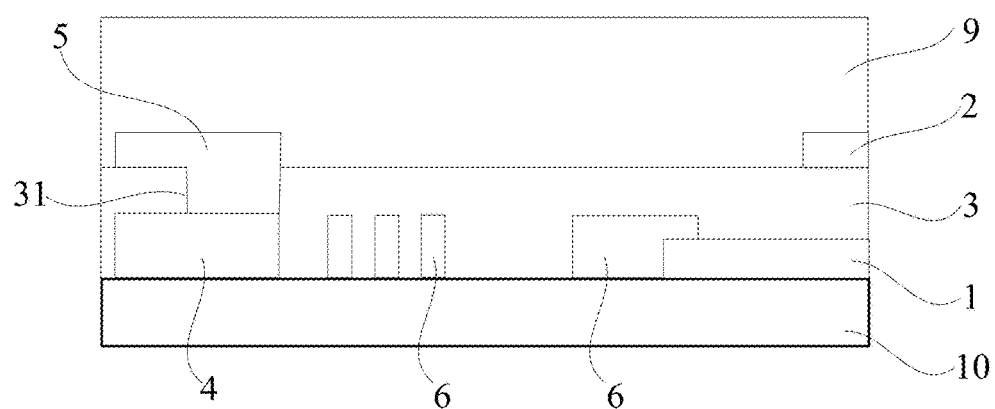
FIG. 2 is a part of a schematically structural view of a touch panel provided in an embodiment of the present disclosure.

In embodiment I, as shown in FIGS. 1 and 2, the touch panel may be an OGS (One Glass Solution) structure. For example, in the touch panel of the present embodiment, the first electrode layer 1 may include a lateral touch electrode 11 and a longitudinal touch electrode 12; and the second electrode layer 2 may include an electrode bridge point 21 configured to bridge the lateral touch electrode 11 and the longitudinal touch electrode 12 at their intersection. As shown in FIG. 1, the electrode bridge point 21 may be a bridging structure disposed at the intersection and configured to connect the longitudinal touch electrode 12.

As shown in FIG. 1 and FIG. 2, in an example, in the touch panel, both of materials of the first electrode layer 1 and the second electrode layer 2 are a transparent electrode material. For example, both the first electrode layer 1 and the second electrode layer 2 are an indium tin oxide (ITO) material layer.

As shown in FIG. 1 and FIG. 2, in an example, the touch panel may also include a metal wiring 6 disposed on a side of the insulating layer 3 facing the first electrode layer 1 and configured to electrically connect the lateral touch electrode 11 and the longitudinal touch electrode 12 with the driving chip 7.

As shown in FIG. 2, for example, the first ground wire 4 may be disposed in the same layer as the metal wiring 6, and the material of the first ground wire 4 may be the same as that of the metal wiring 6. The first ground wire 4 and the metal wiring 6 may be prepared in a same patterning process, which can simplify the manufacturing process of the touch panel.

As shown in FIG. 1, for example, the first ground wire 4 may be electrically connected with the driving chip 7, so as to be electrically connected with the grounding terminal.

As shown in FIG. 2, in an example, the second ground wire 5 may be disposed in a same layer as the second electrode layer 2, and the material of the second ground wire 5 may also be the same as that of the second electrode layer 2. The second ground wire 5 and the second electrode layer 2 may be prepared in a same patterning process, and the manufacturing process of the touch panel can be simplified.

Figure 4:
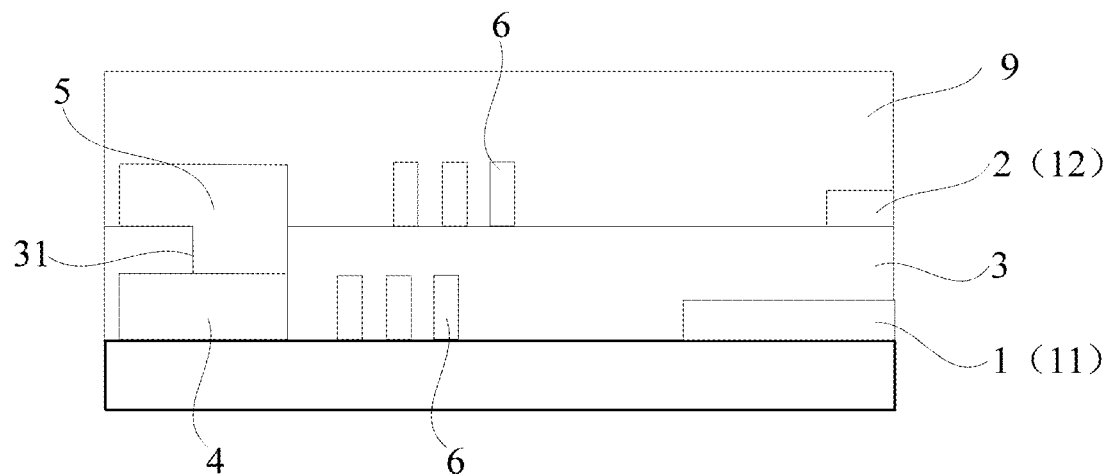
FIG. 4 is a part of a schematically structural view of a touch panel provided in yet another embodiment of the present disclosure.

In the embodiment II, as shown in FIG. 4, in the touch panel of the present embodiment, the first electrode layer 1 may include a lateral touch electrode 11; and the second electrode layer 2 may include a longitudinal touch electrode 12.

As shown in FIG. 4, in an example, the touch panel may be a metal mesh structure. For example, both of the materials of the first electrode layer 1 and the second electrode layer 2 are a metal, and the lateral touch electrode 11 and the longitudinal touch electrode 12 are metal mesh electrodes.

As shown in FIG. 4, in an example, the material of the first ground wire 4 may be the same as that of the first electrode layer 1, and the first ground wire 4 may be disposed in the same layer as the first electrode layer 1. The first ground wire 4 and the first electrode layer 1 may be prepared in a same patterning process, and the manufacturing process of the touch panel can be simplified.

For example, the material of the second ground wire 5 may be the same as that of the second electrode layer 2, and the second ground wire 5 may be disposed in a same layer as the second electrode layer 2. The second ground wire 5 and the second electrode layer 2 may be prepared in a same patterning process, and the manufacturing process of the touch panel can be simplified.

As shown in FIG. 4, in another example, both of the materials of the first electrode layer 1 and the second electrode layer 2 may be a transparent electrode material. For example, both the lateral touch electrode 11 and the longitudinal touch electrode 12 may be an ITO electrode.

As shown in FIG. 4, in an example, the material of the first ground wire 4 may the same as that of the metal wiring of the lateral touch electrode 11 and disposed in a same layer as the metal wiring. The material of the second ground wire 5 may be the same as that of the metal wiring of the longitudinal touch electrode and disposed in a same layer as the metal wiring.

For example, in the lateral touch electrode 11 and the longitudinal touch electrode 12 in the various embodiments, it is possible that the lateral touch electrode 11 is the transmitting electrode, and the longitudinal touch electrode 12 is the sensing electrode; or the lateral touch electrode 11 is the sensing electrode and the longitudinal touch electrode 12 is the transmitting electrode.

An embodiment of the present disclosure also provides a display device that includes the touch panel in any one of the embodiments. The touch panel in the display device in the embodiment of the present disclosure may avoid defectiveness due to electrostatic (ESD) effect, in this way, the display device in the embodiment of the present disclosure has better touch sensing performance and higher reliability.

Figure 5:
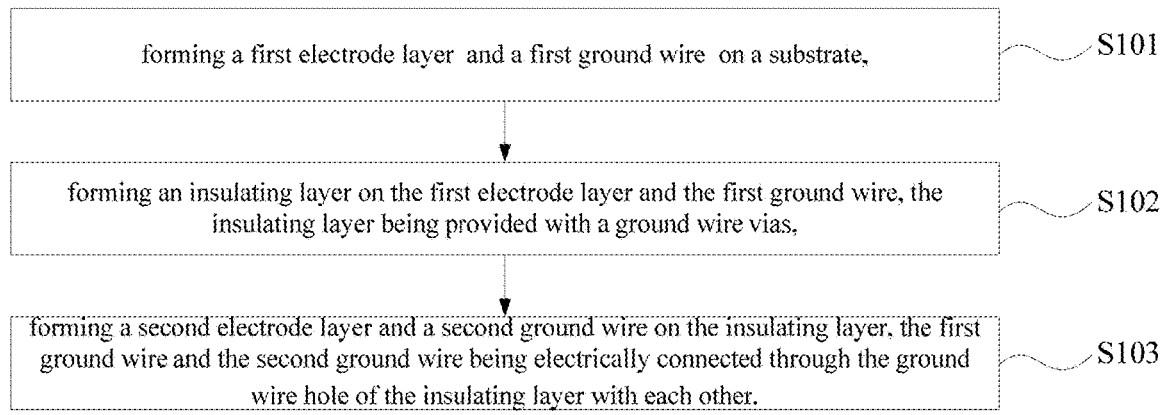
FIG. 5 is a flow chart of a method for manufacturing a touch panel provided in an embodiment of the present disclosure.

An embodiment of the present disclosure also provides a manufacturing method for a touch panel, as shown in FIG. 5 in conjunction with FIGS. 1-4, which includes steps of: step S101, forming a first electrode layer 1 and a first ground wire 4 on a substrate 10; step S102, forming an insulating layer 3 on the first electrode layer 1 and the first ground wire 4, the insulating layer 3 being provided with a ground wire vias 31; and step S103, forming a second electrode layer 2 and a second ground wire 5 on the insulating layer 3.

The first ground wire 4 is electrically connected with the grounding terminal; or the second ground wire 5 is electrically connected with the grounding terminal; or the first ground wire 4 and the second ground wire 5 are electrically connected through the ground wire vias 31 of the insulating layer 3.

In the touch panel formed by the manufacturing method, the first ground wire 4 and the second ground wire 5 are disposed in the two layers of the electrode layer (the first electrode layer 1 and the second electrode layer 2) structure for touch sensing, respectively, and the first ground wire 4 and the second ground wire 5 are both electrically connected with the grounding terminal. In this way, the first ground wire 4 and the second ground wire 5 may serve as an electrostatic shield for the two electrode layers to avoid interference from external charges. In addition, the first ground wire 4 and the second ground wire 5 may conduct static electricity generated in the two electrode layers out in time to avoid poor touch sensing due to electrostatic accumulation and releasing. In this way, the touch panel may avoid defectiveness due to electrostatic (ESD) effect.

Referring to FIG. 1, in an example, the touch panel may include a display area and a black matrix region surrounding the display area. The first electrode layer 1 and the second electrode layer 2 are located in the display area. The first ground wire 4 and the second ground wire 5 are disposed along the black matrix region. For example, the first ground wire 4 and second ground wire 5 can be strip structures extending along the black matrix region.

The first ground wire 4 and the second ground wire 5 extend along the black matrix region, that is, the first ground wire 4 and the second ground wire 5 enclose the first electrode layer 1 and the second electrode layer 2, such that the first ground wire 4 and the second ground wire 5 may effectively shield the first electrode layer 1 and the second electrode layer 2 in which way it is possible to effectively avoid interference with the first electrode layer 1 and the second electrode layer 2 by external charges. Furthermore, the first ground wire 4 and the second ground wire 5 may conduct static electricity generated around the first electrode layer 1 and the second electrode layer 2 out in time, which effectively avoid electrostatic accumulation and may effectively avoid poor sensing of touch due to electrostatic discharge. In addition, the first ground wire 4 and the second ground wire 5 are disposed along the black matrix region, in this way, they are not likely to contact and short with the first electrode layer 1 and the second electrode layer 2, and will not affect the display area due to light blocking, for example.

In embodiment I, as shown in FIGS. 1 and 2, in the touch panel formed by the manufacturing method of the present embodiment, the first electrode layer 1 includes a lateral touch electrode 11 and a longitudinal touch electrode 12; and the second electrode layer 2 includes an electrode bridge point 21 configured to bridge the lateral touch electrode 11 and the longitudinal touch electrode 12 at the intersection. As shown in FIG. 1, the electrode bridge point 12 may be a bridging structure disposed at the intersection and configured to connect the longitudinal touch electrodes 12.

As shown in FIGS. 1, 2 and 5, in an example, in the manufacturing method of the touch panel, step S101, namely the step of forming the first electrode layer 1 and the first ground wire 4 on the substrate 10 may comprise: for example, depositing a transparent electrode layer, such as ITO layer, on the substrate 10, and forming patterns of the lateral touch electrode 11 and the longitudinal touch electrode 12 by a patterning process; and depositing a metal layer on the substrate 10, and forming patterns of the first ground wire 4 and the metal wiring 6 by a patterning process. The metal wiring 6 electrically connects the lateral touch electrode 11 and the longitudinal touch electrode 12 with the driving chip 7, respectively.

For example, the first ground wire 4 is electrically connected with the driving chip 7, which realizes the electrical connection with the grounding terminal.

The step S102, namely the step of forming the second electrode layer 2 and the second ground wire 5 on the insulating layer 10 may include: for example, depositing a transparent electrode layer, such as ITO layer, on the insulating layer 3, and forming patterns of the electrode bridge point 21 and the second ground wire 5 by a patterning process.

In the manufacturing method of the touch panel in the present embodiment, the first ground wire 4, and metal wirings 6 of the sensing electrodes (the lateral touch electrode 11 and the longitudinal touch electrode 12) are formed by a same patterning process; and the second ground wire 5, and the second electrode layer 2 are formed by a same patterning process. In this way, no additional process steps need to be added for the preparing process of the first ground wire 4 and the second ground wire 5. In this way, the manufacturing process of the manufacturing method of the touch panel is simplified.

Figure 3:
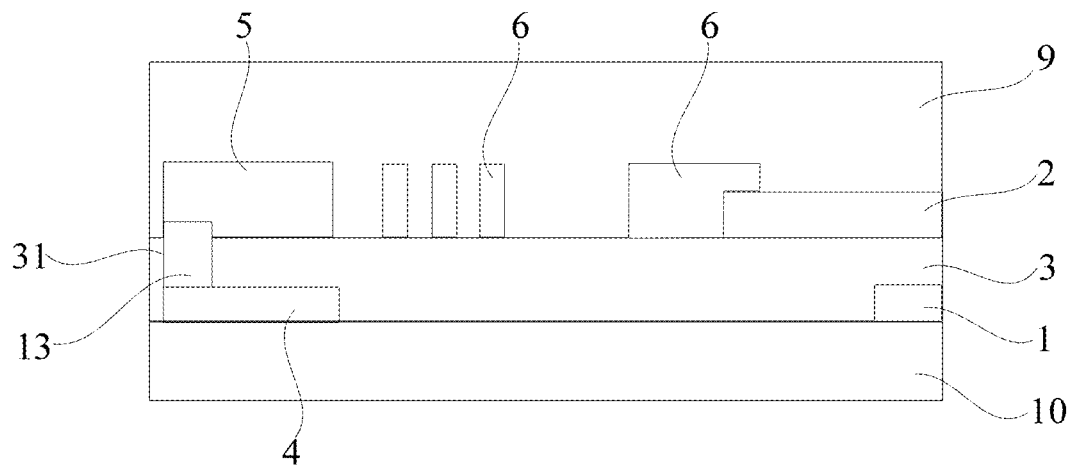
FIG. 3 is a part of a schematically structural view of a touch panel provided in another embodiment of the present disclosure.

In embodiment II, as shown in FIGS. 1 and 3, in the touch panel formed by the manufacturing method of the present embodiment, the second electrode layer 2 includes a lateral touch electrode 11 and a longitudinal touch electrode 12; and the first electrode layer 1 includes an electrode bridge point 21 configured to bridge the lateral touch electrode 11 and the longitudinal touch electrode 12 at the intersection.

As shown in FIGS. 1, 3 and 5, in an example, in the manufacturing method of the touch panel of the present embodiment, step S101, namely the step of forming the first electrode layer 1 and the first ground wire 4 on the substrate 10 may comprise: for example, depositing a transparent electrode layer, such as ITO layer, on the substrate 10, and forming patterns of the electrode bridge point 21 and the first ground wire 4 by a patterning process.

The step S102, namely the step of forming the second electrode layer 2 and the second ground wire 5 on the insulating layer 3 may include: for example, depositing a transparent electrode layer, such as ITO layer, on the insulating layer 3, and forming patterns of the lateral touch electrode 11 and the longitudinal touch electrode 12 by a patterning process; and depositing a metal layer on the insulating layer 3, and forming patterns of the second ground wire 5 and the metal wiring 6 by a patterning process. The metal wiring 6 electrically connects the lateral touch electrode 11 and the longitudinal touch electrode 12 with the driving chip 7.

For example, the second ground wire 5 is electrically connected with the driving chip 7, which realizes the electrical connection with the grounding terminal.

For example, as shown in FIG. 3, the process of patterning the transparent electrode layer to form patterns of the lateral touch electrodes 11 and the longitudinal touch electrodes 12 may simultaneously form the lapping section 13 in the ground wire groove 31 of the insulating layer 3. The lapping section 13 is electrically connected with the first ground wire 4 through the ground wire vias 31. In this way, it is possible to implement the electrical connection between the first ground wire 4 and the second ground wire 5 by connecting the second ground wire 5 on the insulating layer 3 with the lapping section 13.

In the manufacturing method of the touch panel in the present embodiment, the first ground wire 4 and the first electrode layer 1 are formed by a same patterning process, and the second ground wire 5 and metal wirings 6 of the sensing electrodes (the lateral touch electrode 11 and the longitudinal touch electrode 12) are formed by a same patterning process. In this way, no additional process steps need to be added for the preparing process of the first ground wire 4 and the second ground wire 5. The manufacturing process of the manufacturing method of the touch panel is simplified.

In embodiment III, as shown in FIGS. 4 and 5, in the touch panel formed by the manufacturing method of the present embodiment, the first electrode layer 1 includes a lateral touch electrode 11; and the second electrode layer 2 includes a longitudinal touch electrode 12.

As shown in FIGS. 4 and 5, in an example, in the manufacturing method of the touch panel, step S101, namely the step of forming the first electrode layer 1 and the first ground wire 4 on the substrate 10 may comprise: for example, depositing an electrode layer on the substrate 10, and forming patterns of the lateral touch electrode 11 and the first ground wire 4 by a patterning process. For example, the electrode layer may be a metal layer. For example, the lateral touch electrode 11 is a metal mesh electrode. The electrode layer may also be a transparent electrode layer. For example, the lateral touch electrode 11 may be an ITO electrode.

The step S102, namely the step of forming the second electrode layer 2 and the second ground wire 5 on the insulating layer 3 may include: for example, depositing an electrode layer on the insulating layer 3, and forming patterns of the longitudinal touch electrode 12 and the second ground wire 5 by a patterning process. For example, the electrode layer may be a metal layer. For example, the longitudinal touch electrode 12 is a metal mesh electrode. The electrode layer may be a transparent electrode layer. For example, the longitudinal touch electrode 12 may be an ITO electrode.

Figure 6:
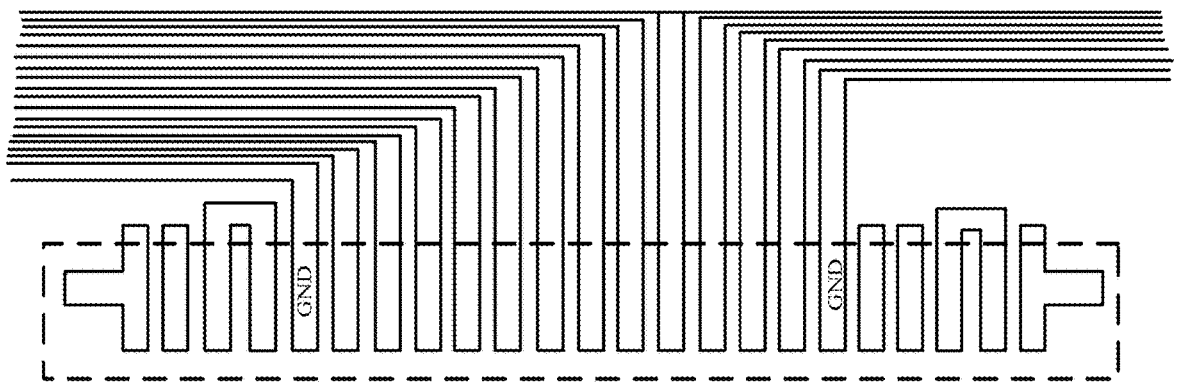
FIG. 6 is a schematic plan view of a bonding area in the peripheral area with first and second ground wire layers formed as provided in an embodiment of the present disclosure.
Figure 7:
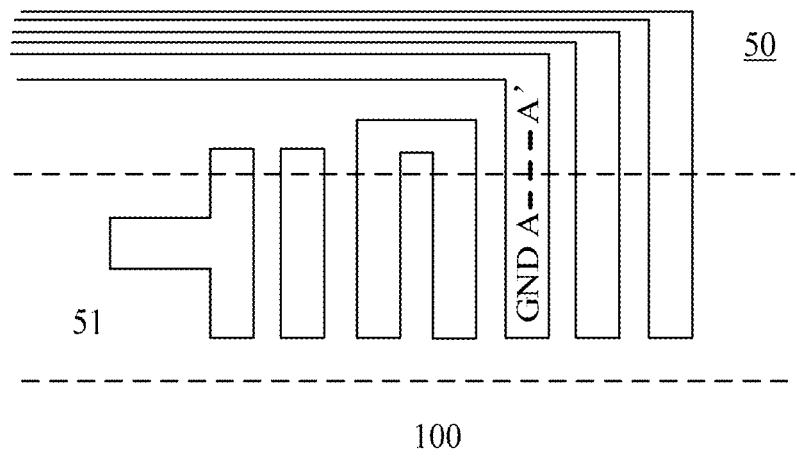
FIG. 7 is an enlarged plan view of the left part of FIG. 6 with line A-A'.
Figure 8A:
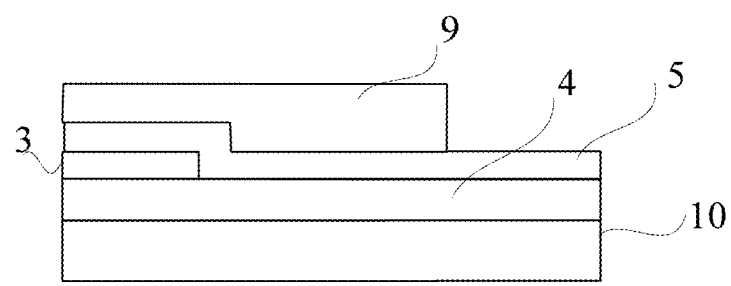
FIG. 8A-8B are schematically sectional views of the bonding area in the touch panel taken along the line A-A' in FIG. 7.
Figure 8B:
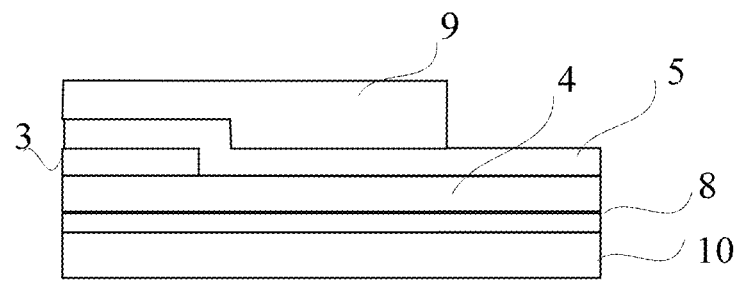

FIG. 6 shows a schematic plan view of a bonding area 50 in the peripheral area with first and second ground wire layers of a touch panel provided in an embodiment of the present disclosure, in which the region blocked in the dashed line is the ground (GND) bonding pad region 51, and the upper ground wire (layer) can be shown. As shown in FIGS. 6-8B, the first ground wire layer 4 including a first ground wire and the second ground wire layer 5 including a second ground wire are formed in bonding area 50 of the peripheral area. As also shown in FIG. 7 and FIG. 8A-8B, which are schematically sectional views taken alone line A-A' in FIG. 7, the second ground wire layer 5 covers and contacts the first ground wire layer 4 in the bonding area.

For example, the second ground wire layer 5 may have an orthographic projection on the substrate 10 overlapping with the orthographic projection of the first ground wire layer 4 on the substrate 10.

For example, the insulating layer 3, such as an interlayer insulating film, includes an opening. The opening of the insulating layer 3 exposes a part of the first ground wire layer in the bonding area, and the two ground wires are electrically connected in parallel in the opening of the insulating layer 3 in the bonding area.

As also shown in FIG. 6, for example, the two ground wires on the left part and right part of the plan view of FIG. 6 are both electrically connected in parallel in two openings formed in the insulating layer 3 in the bonding area 50, respectively.

Figure 10:
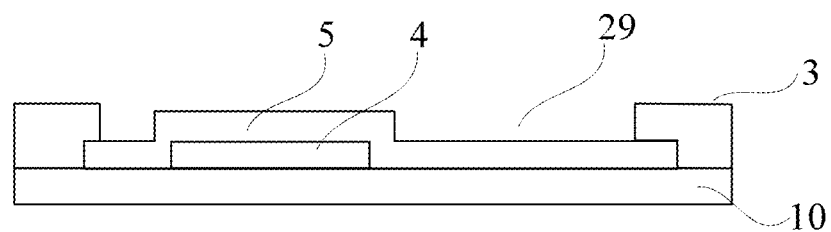
FIG. 10 is a schematically sectional view of the bonding area in the touch panel taken along the line B-B' in FIG. 9.

For example, as shown in FIGS. 8A-B and 10, the opening 29 may be formed in the insulating layer 3 by an etching process in a region of the bonding area near the side of the display area AA of the touch panel. For example, the etching process may be a dry or wet etching process.

As shown in FIG. 8A, which is a schematically sectional view cut along the line A-A' of FIG. 7, in the bonding area 50, the second ground wire layer 5 directly contacts the first ground wire layer 4 in the opening 29 of the insulating layer 3 in a region of the bonding area near the display area. The right part configuration of the bonding area 50 may be similar to the left part configuration of the bonding area 50 as shown in FIG. 8A-8B, which is not repeated herein.

For example, the second ground wire layer 5 may totally cover the first ground wire layer 4. That is, the second ground wire layer may have an orthographic projection on the substrate 10 overlapping with the orthographic projection of the first ground wire layer 4 on the substrate 10.

For example, the widths of the two ground wire layers may be same. For example, the width of the second ground wire layer 5 may be wider than the width of the first ground wire layer 4. However, embodiments of the present disclosure are not limited thereto.

For example, as shown in FIG. 8B, the touch panel may also include a buffer layer 8 formed on the substrate before the first ground wire layer 4 is formed. That is, the buffer layer 8 is formed between the substrate 10 and the first ground wire layer 4, as shown in FIG. 8B.

Figure 9:
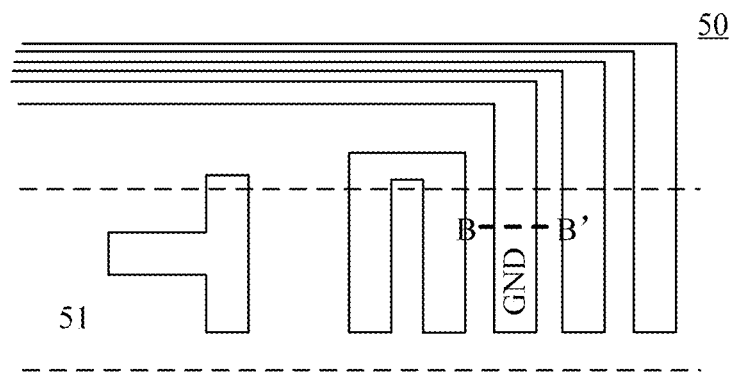
FIG. 9 is an enlarged plan view of the left part of FIG. 6 with line B-B'.

As also shown in FIG. 10, which is a schematically sectional view cut along line B-B' of FIG. 9, the second ground wire layer 5 totally covers the first ground wire layer 4, and the two ground wire layers are formed in the bonding area, and are directly contacted with each other in a region of the bonding area near the display area of the touch panel.

It is to be noted that the right part of the bonding area can be similar to that the left part of the bonding area, as shown in FIG. 6, which is not repeated herein.

Figure 11:
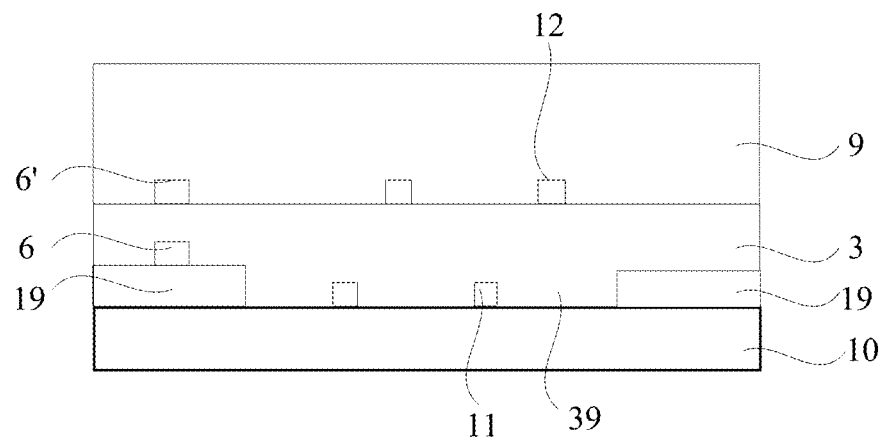
FIG. 11 is a schematically sectional view of a touch panel provided in another embodiment of the present disclosure.
Figure 12:
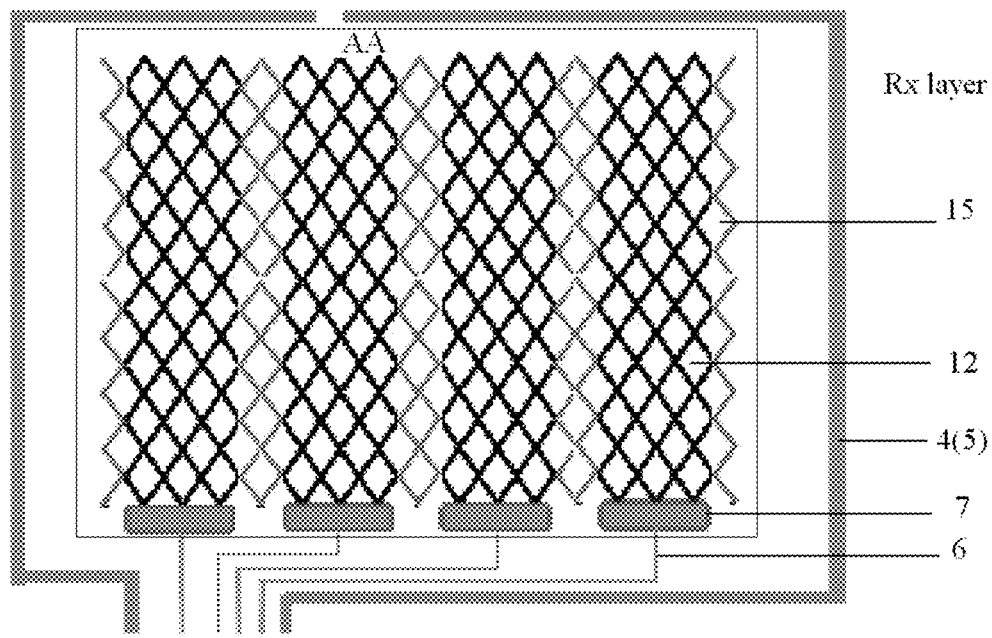
FIG. 12 is a schematically structural diagram of a touch panel with Rx electrode layer provided in an embodiment of the present disclosure.
Figure 13:
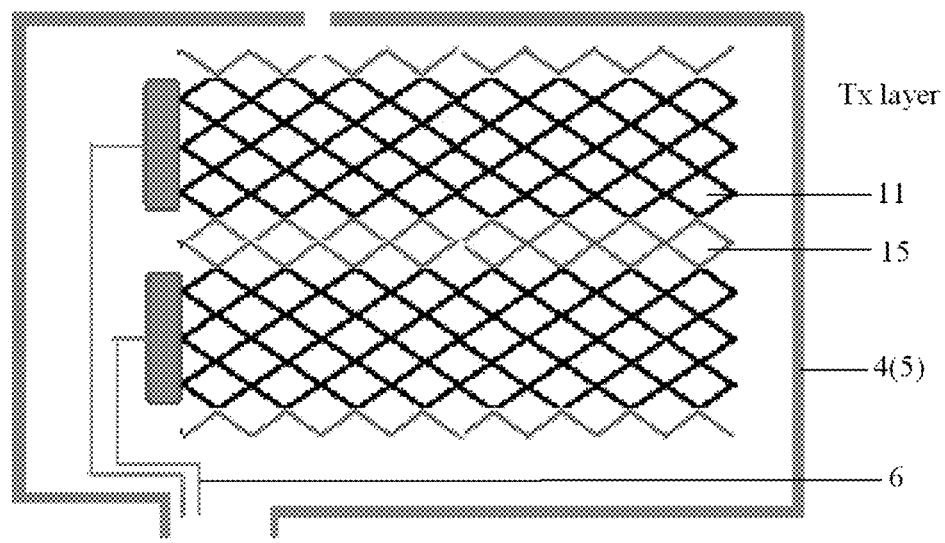
FIG. 13 is a schematically structural diagram of a touch panel with Tx electrode layer provided in an embodiment of the present disclosure.

In an embodiment, for example, a display area AA of a touch panel in a metal mesh mode is shown in FIGS. 11-13. The tough panel may comprise a substrate 10, a black matrix 19 formed on the substrate, and the sensing electrode structure including a plurality of lateral touch electrodes 11 (e.g., Tx electrodes) or a plurality of longitudinal touch electrodes 12 (e.g., Rx electrodes) formed on the substrate 10 in the apertures 39 of the black matrix 19, a metal wirings 6 may be formed on the black matrix 19 with a same material or layer as the Rx layer or Tx electrode layer; a first insulating layer 3 formed on the black matrix 19 and the sensing electrodes, and a second metal wirings 6' and a plurality of longitudinal touch electrodes 12 (e.g., Rx electrodes) or a plurality of lateral touch electrodes 11 (e.g., Tx electrodes) formed on the insulating layer 3. For example, the touch panel may further comprise a second insulating layer 9 (e.g., a passivation layer) formed on the insulating layer 3. For example, the second metal wirings 6' may be formed with a same material and same layer as the sensing electrodes.

In an embodiment of the present disclosure, as shown in FIGS. 12 and 13, the sensing electrode structure may comprise a Rx electrode layer and Tx electrode layer, which are intersected with each other to form a metal mesh electrode structure. For example, the Rx electrode layer may include a plurality of longitudinal touch electrodes 12, each longitudinal touch electrode 12 may electrically connected to a driving integrated chip 7. For example, the Tx electrode layer may include a plurality of lateral touch electrodes 11, each lateral touch electrode 11 may electrically connected to a driving integrated chip 7. In this way, each touch electrode can be controlled independently. The double layer of ground wire layers 4 and 5 of the embodiments of the present disclosure may be formed in the peripheral area surround the display area AA. In this way, a metal mesh touch panel is formed.

For example, as shown in FIGS. 12-13, each electrode of the longitudinal electrodes and lateral electrodes may further include sub-longitudinal electrodes and sub-lateral electrodes to form a sub-mesh structure in each of touch electrode channel.

Figure 14:
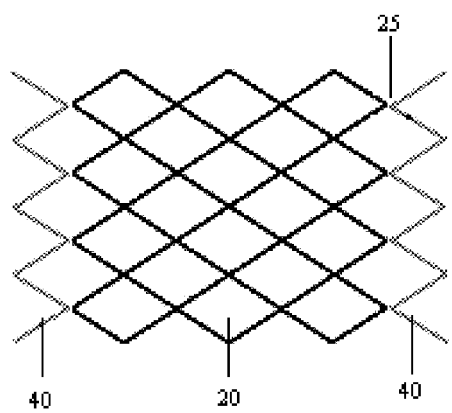
FIG. 14 is a schematically structural diagram of a touch panel with dummy regions and a touch electrode region provided in an embodiment of the present disclosure.

For example, as shown in FIGS. 12-14, the sensing electrode structure may further comprise dummy electrodes 15. In other words, the sensing electrode structure may comprise electrode regions 20 and dummy regions 40. Each dummy region 40 and its adjacent electrode region 20 are formed with a gap 25. For example, the dummy region refers to grids formed between the adjacent touch electrodes or touch channels.

For example, the substrate can be a glass substrate, a plastic substrate, or a quartz substrate, embodiments of the present disclosure are not limited thereto.

An embodiment of the present disclosure also provides a display device that includes the touch panel in any one of the embodiments.

For example, the display device in the present embodiment may be any product or component with display function, such as mobile phone, tablet computer, television, display, notebook computer, digital photo frame, and navigator.

An embodiment of the present disclosure also provides a method of manufacturing the touch panel. Referring to the figures, for example, as shown in FIGS. 8A-B and 10-14, the method comprises: providing a substrate 10, forming a first metal layer on the substrate 10, patterning the first metal layer to form a pattern of a first ground wire, in other words, a first ground wire layer 4 is formed; forming an insulating layer (e.g., an interlayer insulating film) 3 on a part of the first ground wire layer; forming a second metal layer on the insulating layer 3 and the other part of the first ground wire layer 4; patterning the second metal layer 5 by a patterning process to form a pattern of the second ground wire, that is, the second ground wire layer; and forming a second insulating layer 9, such as a passivation layer, on the second ground wire layer 5.

For example, the method may further comprise forming a buffer layer 8 on the substrate 10 before the first ground wire layer 4 is formed on the substrate 10.

For example, the method may further comprise forming the first electrode layer 1 and second electrode layer 2 on the substrate 10 or the buffer layer 8, as above embodiments.

For example, as shown in FIGS. 11-14, the method may further comprise forming a black matrix 19 with a plurality of apertures 39 to receive the first electrode layer 1 including a plurality of lateral touch electrodes 11; forming a first metal wiring layer including metal wirings 6 on the black matrix 19; and forming a second metal wiring layer including second metal wirings 6' on the insulating layer 3. The second electrode layer 2 comprises a plurality of longitudinal touch electrodes 12, the plurality of the lateral touch electrodes 11 and the plurality of longitudinal touch electrodes 12 are formed to be intersected to and insulated from each other by the insulating layer 3 to faint a mesh touch structure in the display area AA.

For example, as shown in FIG. 11, the first ground wire layer 4, the metal wirings 6, and the first electrode layer 1 (e.g., Rx layer) may be formed by a same patterning process; and the second ground wire layer 5, the metal wirings 6' and the second electrode layer 2 (e.g., Tx layer) may be formed by a same patterning process. In this way, no additional process steps need to be added for the preparing process of the first ground wire layer 4 and the second ground wire layer 5. The manufacturing process of the manufacturing method of the touch panel is simplified.

For example, the two layers of electrodes are formed to be intersected with each other and insulated from each other by the insulating layer 3 to form a metal mesh touch panel.

For example, the two ground wire layers are insulated from each other by an insulating layer in a region of the bonding area out of the display area of the touch panel. For example, all the metal layers can be deposited by a chemical vapor deposition (CVD), a plasma enhanced chemical vapor deposition, a physical vapor deposition, a sputtering process, or an atomic layer deposition process, however, embodiments of the present disclosure are not limited thereto.

Other details of the method may refer to the above embodiments about the touch panel and the operations, which are not repeated here.

It is to be noted that the embodiments are only illustrations of the touch panel manufacturing method of the embodiment of the present disclosure, and the manufacturing method of the embodiments of the present disclosure is not limited to the embodiments.

The described above are only exemplary embodiments of the present disclosure, and the present disclosure is not intended to be limited thereto. For one of ordinary skill in the art, various changes and alternations may be readily contemplated without departing from the technical scope of the present disclosure, and all of these changes and alternations shall fall within the scope of the present disclosure.

What is claimed is:

1. A touch panel, comprising a display area, and a peripheral area including a bonding area on a substrate;
a first electrode layer and a second electrode layer configured to sense touch;
a first insulating layer provided between the first electrode layer and the second electrode layer;
a first ground wire layer provided in the bonding area on the substrate, the first insulating layer including an opening provided on the first ground wire layer, the opening exposing a part of the first ground wire layer; and
a second ground wire layer provided on the first insulating layer and the exposed part of the first ground wire layer in the bonding area;
wherein the exposed part of the first ground wire layer and the second ground wire layer contact each other in the opening of the first insulating layer in the bonding area.

2. The touch panel according to claim 1, wherein the first electrode layer and the second electrode layer are disposed in the display area; the first ground wire layer including a first ground wire and the second ground wire layer including a second ground wire disposed in the bonding area; and the first ground wire and the second ground wire in the bonding area are electrically connected in parallel in the opening of the insulating layer in the bonding area.

3. The touch panel according to claim 2, further comprising: a plurality of dummy electrodes provided between any adjacent longitudinal touch electrodes or any adjacent lateral touch electrodes, wherein a gap is provided between any adjacent touch electrode and a corresponding dummy electrode.

4. The touch panel according to claim 1, wherein the second ground wire layer has an orthographic projection on the substrate overlapping with an orthographic projection of the first ground wire layer on the substrate.

5. The touch panel according to claim 1, wherein the first ground wire layer has a width same as a width of the second ground wire layer.

6. The touch panel according to claim 1, wherein the second ground wire layer has a width wider than a width of the first ground wire layer.

7. The touch panel according to claim 6, further comprising a buffer layer provided on the substrate, the buffer layer being disposed between the substrate and the first ground wire layer; and a second insulating layer provided on the second ground wire layer.

8. The touch panel according to claim 1, wherein the first electrode layer comprises a plurality of lateral touch electrodes, and the second electrode layer comprises a plurality of longitudinal touch electrodes, the plurality of the lateral touch electrodes and the plurality of longitudinal touch electrodes being intersected to and insulated from each other by the first insulating layer to form a mesh touch structure.

9. The touch panel according to claim 8, further comprising, a black matrix provided on the substrate with a plurality of apertures, the first lateral touch electrodes being formed in the apertures;
a first metal wiring layer on the black matrix, wherein the first metal wiring layer includes first wirings configured to electrically connect with first driving integrated chips respectively connected with the lateral touch electrodes; and
a second metal wiring layer including second wirings on the first insulating layer and configured to electrically connect with second driving integrated chips respectively connected with the longitudinal touch electrodes;
wherein the first ground wire layer and the first metal wiring layer are disposed in a same layer, and the first ground wire layer includes a material same as that of the first metal wiring layer; and the second ground wire layer and the second metal wiring layer are disposed in a same layer, and the second ground wire layer includes a material same as that of the second metal wiring layer.

10. The touch panel according to claim 9, wherein the second ground wire layer and the second electrode layer are disposed in a same layer and the second ground wire layer includes a material same as that of the second electrode layer.

11. The touch panel according to claim 9, wherein the first ground wire layer includes a material same as that of the first electrode layer, and the first ground wire layer is disposed in a same layer as the first electrode layer.

12. The touch panel according to claim 11, wherein two openings are provided in the first insulating layer in the bonding area; the second ground wire layer includes a material same as that of the second electrode layer, and the second ground wire layer and the second electrode layer are disposed in a same layer.

13. A display device, comprising a touch panel, wherein the touch panel comprises:
a display area, and a peripheral area including a bonding area on a substrate;
a first electrode layer and a second electrode layer configured to sense a touch;
a first insulating layer provided between the first electrode layer and the second electrode layer;
a first ground wire layer provided in the bonding area on the substrate, the first insulating layer including an opening provided on the first ground wire layer, the opening exposing a part of the first ground wire layer; and
a second ground wire layer provided on the first insulating layer and the exposed part of the first ground wire layer in the bonding area;
wherein the exposed part of the first ground wire layer and the second ground wire layer contact each other in the opening of the first insulating layer in the bonding area.

14. A manufacturing method of a touch panel, the touch panel including a display area and a peripheral area including a bonding area, the method comprising:
providing a substrate;
forming a first electrode layer in the display area, and a first ground wire layer in the bonding area on the substrate;
forming a first insulating layer on the first electrode layer and the first ground wire layer;
forming an opening in the first insulating layer to expose a part of the first ground wire layer;
forming a second electrode layer in the display area, and a second ground wire layer in the bonding area on the first insulating layer and the exposed part of the first ground wire layer;
wherein the exposed part of the first ground wire layer and the second ground wire layer contact each other in the opening of the first insulating layer in the bonding area.

15. The manufacturing method according to claim 14, wherein the first electrode layer and the second electrode layer are formed in the display area; the first ground wire layer including a first ground wire and the second ground wire layer including a second ground wire are formed in the bonding area; and the first ground wire and the second ground wire in the bonding area are electrically connected in parallel in the opening of the first insulating layer.

16. The manufacturing method according to claim 14, wherein the second ground wire layer has an orthographic projection on the substrate overlapping with an orthographic projection of the first ground wire layer on the substrate.

17. The manufacturing method according to claim 14, further comprising,
forming a black matrix with a plurality of apertures to receive the first electrode layer including a plurality of lateral touch electrodes;
forming a first metal wiring layer on the black matrix; and
forming a second metal wiring layer on the first insulating layer;
wherein the second electrode layer comprises a plurality of longitudinal touch electrodes, the plurality of the lateral touch electrodes and the plurality of longitudinal touch electrodes being intersected to and insulated from each other by the first insulating layer to form a mesh touch structure.

18. The manufacturing method according to claim 17, wherein the first ground wire layer has a width same as a width of the second ground wire layer.

19. The manufacturing method according to claim 18, wherein the width of the second ground wire layer is wider than the width of the first ground wire layer.

20. The manufacturing method according to claim 14, further comprising,
depositing a metal layer on the substrate and forming a pattern of a first ground wire by a patterning process;
etching the first insulating layer by an etching process to form the opening in the first insulating layer in the bonding area;
depositing a metal layer on the first insulating layer formed with the opening and forming a pattern of a second ground wire by a patterning process;
wherein the second ground wire and the first ground wire are electrically connected in parallel in the opening of the first insulating layer.

* * * * *